(No Model.)
B. I. PRICE.
EYE TESTING DEVICE.
No. 505,000. Patented Sept. 12, 1893.
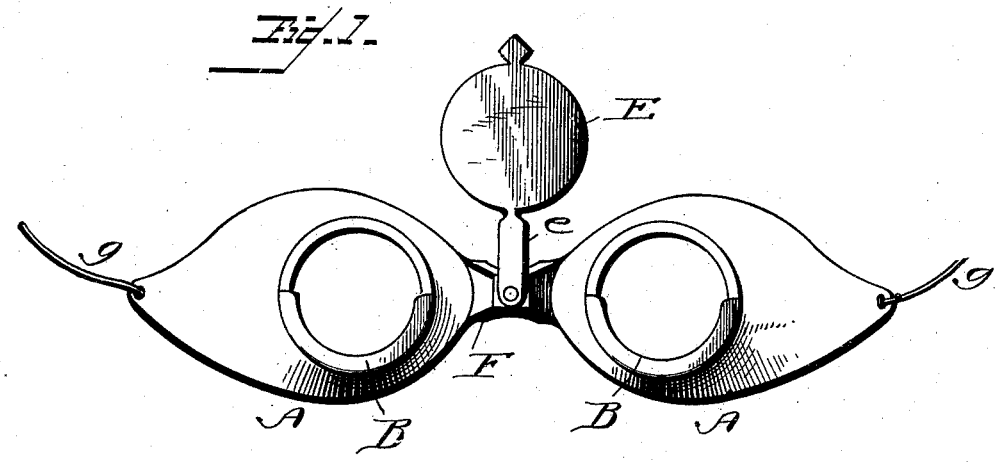
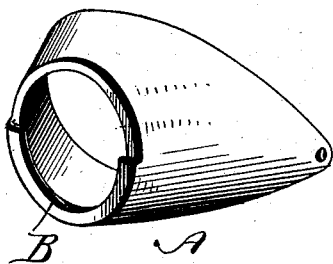
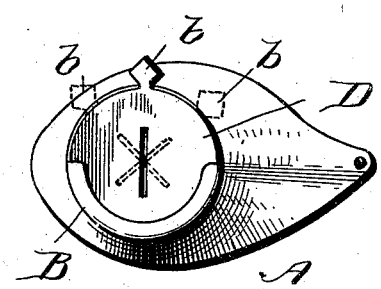
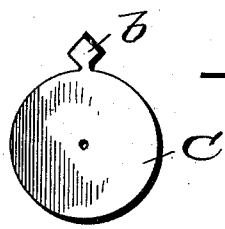
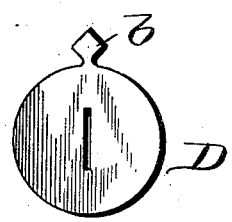
Witnesses
Inventor
Benjamin I. Price,
By Attorneys

UNITED STATES PATENT OFFICE.

BENJAMIN I. PRICE, OF DENVER, COLORADO.

EYE-TESTING DEVICE.

SPECIFICATION forming part of Letters Patent No. 505,000, dated September 12, 1893.

Application filed December 15, 1892. Serial No. 455,268. (No model.)

*To all whom it may concern:*

Be it known that I, BENJAMIN I. PRICE, a citizen of the United States, residing at Denver, in the county of Arapahoe, State of Colorado, have invented certain new and useful Improvements in Eye-Testing Devices; and I do hereby declare the following to be a full, clear, and exact description of the invention, such as will enable others skilled in the art to which it appertains to make and use the same.

My invention relates to appliance for ascertaining the condition of the human eye; and has for its object to provide a frame which can be adjusted to the eye after the fashion of a pair of spectacles and which will exclude the rays of light except those entering through the apertures in the test disks that are provided at the front portion of the eye piece.

The improvement consists of the novel features and the peculiar construction and combination of the parts which will be hereinafter more fully described and claimed and which are shown in the annexed drawings, in which—

Figure 1 is a front view of the frame of the appliance, the blank disk being shown turned up to a position midway between the two eye pieces. Fig. 2 is a perspective view of an eye piece of the frame, showing more clearly the inwardly turned flanged or grooved seat provided at the lower half for receiving and holding in place the test disks. Fig. 3 is a front view of an eye piece showing the application of a test disk, the operation of the latter being shown by dotted lines. Fig. 4 shows different forms of test disks.

The frame presents the appearance of a pair of goggles and is composed of two eye pieces A A of similar construction and a bridge or nose piece F which connects the said eye pieces. These eye pieces are formed from sheet metal or other substance that will exclude the rays of light and are so shaped as to fit close to the face and prevent the entrance of rays of light. The front portion of the eye pieces is open, and is provided on the lower half with an inwardly turned flange or groove B designed to receive and hold in place the test disks C and D. The test disks are provided with thumb pieces *b* by means of which the same are handled and adjusted to the goggle shaped frame, and are provided with apertures to meet the desired requirements. The disk C is provided with a pin hole aperture which is centrally disposed. The disk D is provided with a slot. Obviously other disks will be provided having apertures to meet the various requirements of the oculist.

It is not always desirable to test both eyes at the same time and for this purpose a blank disk E is provided and for convenience is pivoted by means of shank *e* to the bridge or nose piece F so as to be turned and close the open side of either eye piece. When in position this blank disk will rest in the groove D and be held in place thereby. In the preferable form of construction the front side of the bridge or nose piece is in the same plane with the front side of the eye pieces. Hence the shank *e* and the blank disk E may be straight and the disk E will close and fit snugly against the front side of the eye pieces and exclude rays of light.

The frame will be held on the patient by any well known means, preferably by cords *g* which are attached to the eye pieces by being passed through openings therein.

To test the eye the disk having the desired shape aperture therein is placed in the groove B and is adjusted to the required position by being rotated in said seat either to the right or left. Disks having different shaped apertures may be placed in the eye pieces if required to test both eyes at the same time, but if in the event of testing only one eye, the rays of light are excluded from the eye not to be tested by means of a blank disk E in the manner aforesaid.

Having thus described my invention, what I claim, and desire to secure by Letters Patent, is—

1. The combination with a frame having goggle shaped eye pieces, and having grooved seats at the lower side of the opening in said eye pieces, of a disk pivoted to the nose piece or bridge of said frame and adapted to be turned to rest in and be held in place by the grooved seat in either of the eye pieces, substantially as set forth.

2. The combination with a frame having goggle shaped eye pieces provided with grooved seats at the lower side of the eye piece opening, and having the front side of the bridge or nose piece in the same plane as the front side of the eye pieces, of a disk having a shank pivoted to the front side of said bridge and adapted to be turned to come in front of either eye piece and be supported and held in place by the groove seat on said eye piece, substantially as set forth.

3. The herein specified eye testing appliance composed of goggle shaped eye pieces having grooved seats B at the lower side of the openings, a bridge connecting said eye pieces, a blank disk pivoted to said bridge and adapted to be turned to close the opening in either eye piece, and test disks having thumb pieces and provided with suitably shaped apertures, substantially as set forth.

In testimony whereof I affix my signature in presence of two witnesses.

BENJAMIN I. PRICE.

Witnesses:
W. J. WINTER,
F. M. CONEHOY.